Nov. 30, 1926.

F. R. OWENS

WINDMILL WHEEL

Filed August 5, 1925    3 Sheets-Sheet 1

F. R. OWENS.    INVENTOR

BY *Victor J. Evans*

ATTORNEY

WITNESS:

Nov. 30, 1926.
1,609,184
F. R. OWENS
WINDMILL WHEEL
Filed August 5, 1925    3 Sheets-Sheet 2
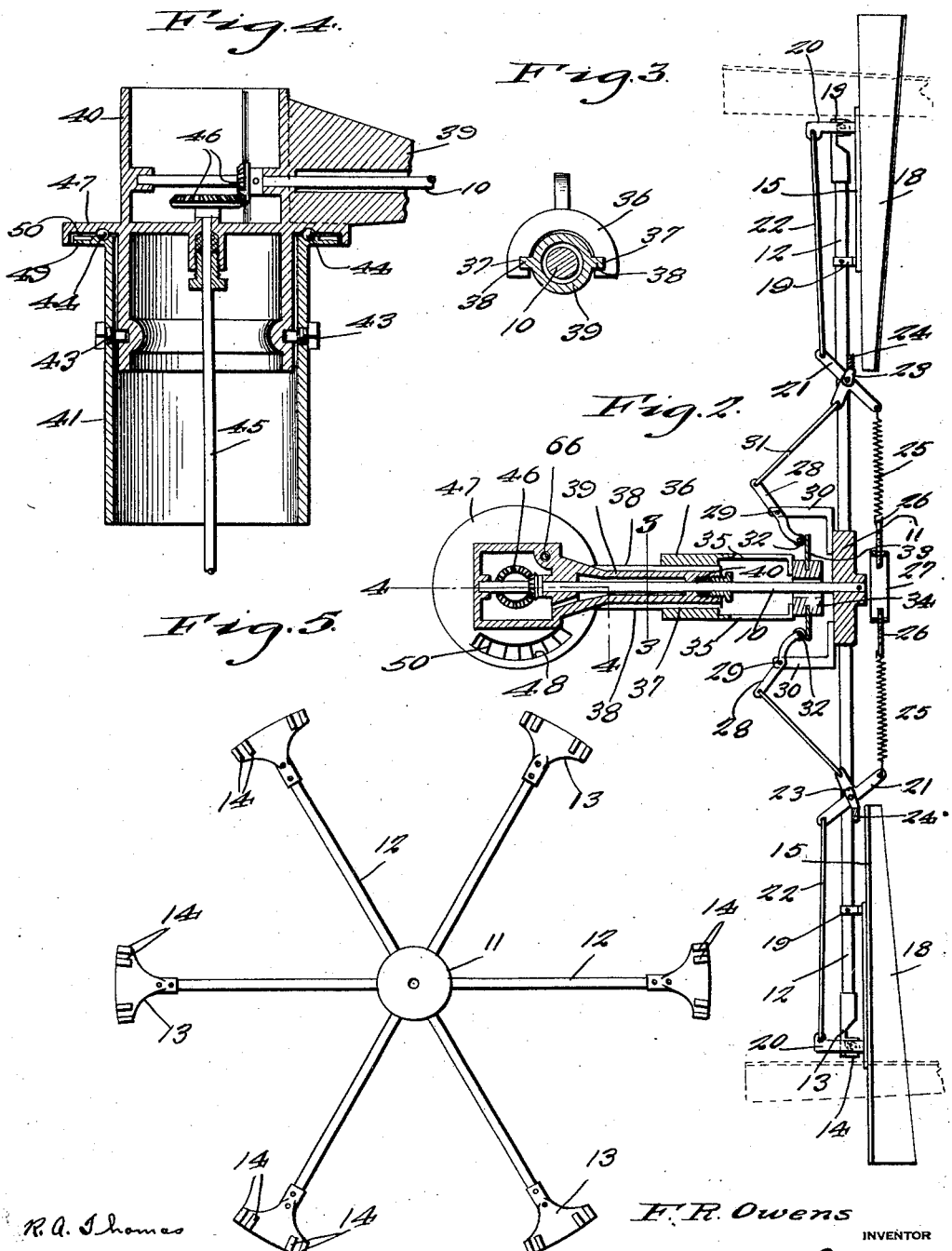

Nov. 30, 1926.

F. R. OWENS

WINDMILL WHEEL

Filed August 5, 1925   3 Sheets-Sheet 3

F. R. Owens INVENTOR

Patented Nov. 30, 1926.

1,609,184

UNITED STATES PATENT OFFICE.

FRANK R. OWENS, OF BEAVER CROSSING, NEBRASKA.

WINDMILL WHEEL.

Application filed August 5, 1925. Serial No. 48,339.

This invention relates to windmills or wind motors and is an improvement upon a mill disclosed in my copending application, Serial No. 7651, filed February 7, 1925.

The present invention relates particularly to the wheel structure and has for an object the provision of a wheel constructed so that its blades—which are normally disposed at right angles to its axis—may be swung to a position substantially parallel with said axis, or to an intermediate position, so as to stop the operation of the mill or reduce its speed of operation.

Another object of the invention is the provision of novel means for moving the blades of the wheel so that they may remain in an active position or in any adjusted position.

With the above and other objects in view, the invention further includes the following novel features and details of construction, to be hereinafter more fully described, illustrated in the accompanying drawings and pointed out in the appended claims.

In the drawings:—

Figure 2 is a horizontal sectional view with the wheel in place.

Figure 3 is an enlarged fragmentary section taken substantially on the line 3—3 of Figure 2.

Figure 4 is an enlarged fragmentary section taken substantially on the line 4—4 of Figure 2, the view being on an enlarged scale.

Figure 5 is a detail elevation of the wheel spokes or arms.

Figure 1:
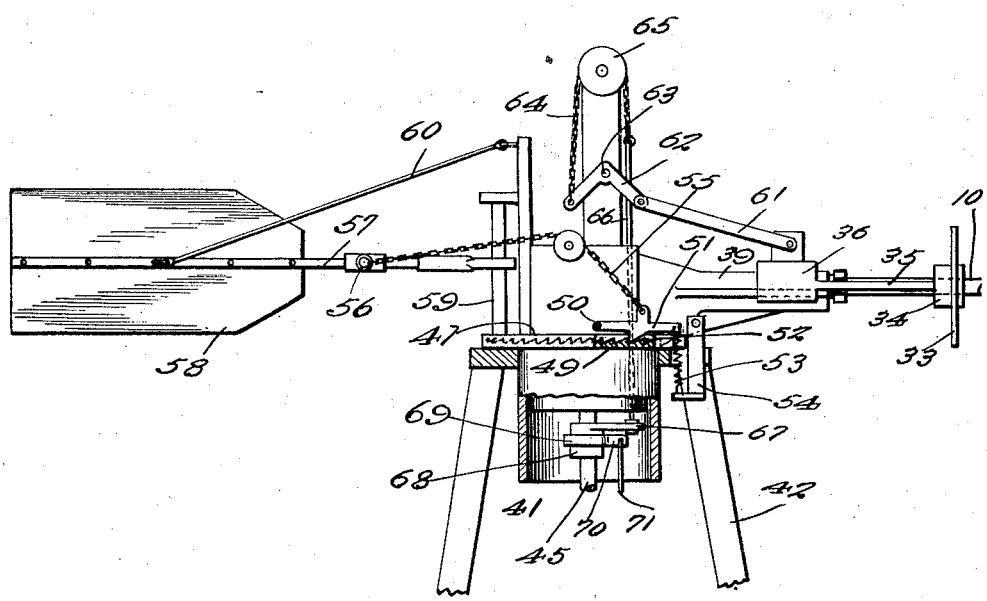
Figure 1 is an elevation partly in section showing the head of the mill, the wheel being removed.
Figure 6:
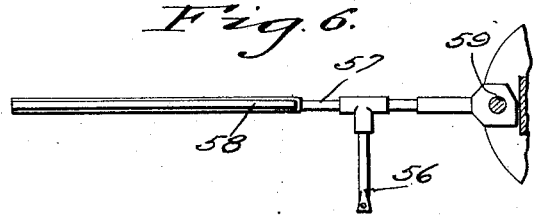
Figure 6 is a fragmentary top plan view showing the manner of mounting the wind vane.

Referring to the drawings in detail wherein like characters of reference denote corresponding parts, the wheel which is mounted upon the driving shaft 10 includes a hub 11 from which extend radial arms or spokes 12, while carried at the outer ends of these spokes are plates 13 which include spaced pairs of apertured ears 14.

Figure 7:
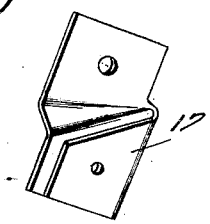
Figure 7 is a detail perspective view of one of the blade attaching brackets.

Pivotally mounted between the arms 12 are arcuate frames 15 and these frames are provided near their opposite ends with apertured lugs 16 which are received between the pairs of ears 14, so that the frames 15 are mounted for pivotal movement. Each of the arcuate frames 15 has secured thereon by means of attaching brackets 17 (Figure 7), blades 18, the latter being disposed at an angle with respect to the frames 15 as is usual in wind wheels. The construction just described provides a wheel which is formed of a number of pivotally mounted segmental sections, pivotal movement in one direction being limited by stops 19 mounted upon the spokes 12.

Figure 8:
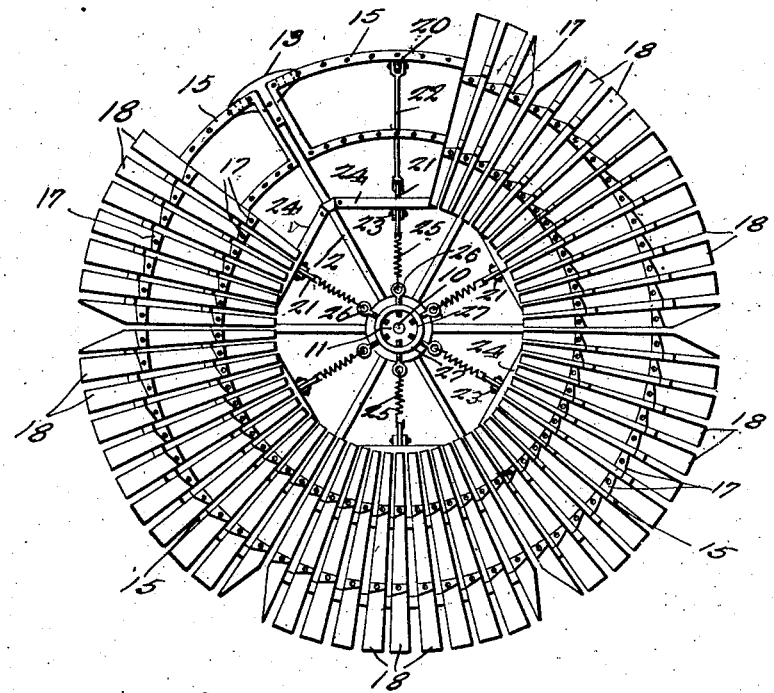
Fig. 8 is an elevation of the wheel with some of the blades removed.
Figure 9:
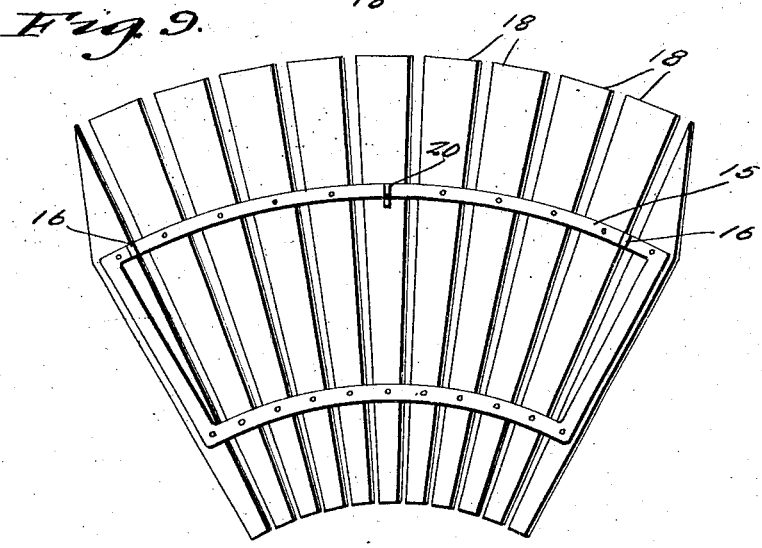
Fig. 9 is a rear elevation of one of the segmental blade sections of the wheel.

Normally, the segmental sections of the wheel are disposed as illustrated in Figures 2 and 8 of the drawings so that the wheel will rotate in the wind, but these segmental sections are capable of being swung upward substantially parallel to the axis of the wheel, as illustrated by the dotted lines in Figure 2. To provide for this each of the frames 15 has extending therefrom an arm 20 which is connected to a substantially T-shaped lever 21 by means of a rod 22. The levers 21 are mounted between spaced ears 23 which are carried by bars 24, the opposite ends of which are secured to the spokes 12. The levers 21 have connected thereto the outer ends of springs 25 and the inner ends of these springs are adjustably connected as shown at 26 to a ring or equivalent member 27. The tendency of the springs is to hold the blades of the wheel in an active position and the tension of the springs may be regulated by the adjustment at 26.

The remaining arm of each of the levers 21 is connected to one end of an arm 28 and these arms are pivotally mounted as shown at 29 upon brackets 30 supported upon the hub 11 of the wheel. Connection between the outer ends of the arms 28 and the levers 21 is preferably in the form of a rod 31. The inner ends of the arms 28 carry rollers 32 which bear against an annular member or plate 33, the latter being carried upon a collar 34 through which the shaft 10 extends. This collar is connected by arms 35 with a slide 36 which is provided with grooves 37, the latter receiving diametrically disposed ribs 38 which extend longitudinally of a sleeve or housing 39 through which the shaft 10 also extends. The outer end of the housing 39 is provided with a suitable packing 40 around the shaft 10.

The housing 39 forms the head 40 of the mill and this head is mounted for rotation upon a stationary sleeve 41 suitably supported upon a tower or other support indicated at 42. The head 40 has a swiveled connection with the stationary sleeve 41 as shown at 43 and is supported upon anti-friction bearings 44 so as to provide freedom of rotation. A driven shaft 45 extends upward through the sleeve 41 and is geared to the shaft 10 as shown at 46.

The head 40 includes an annular flange 47 which is provided with an arcuate slot 48, while the sleeve 43 is provided with an annular flange 49 having ratchet teeth 50 in its upper face. The teeth 50 extend entirely around the upper face of the flange 49 and are disposed beneath the slot 48 while pivotally mounted upon the head 40 as indicated at 50 is a dog 51. This dog carries a tooth 52 which is adapted to extend through the slot 48 and engage the teeth 50 and is yieldingly held in such engagement by means of a spring 53 which connects the dog with a bracket arm 54. Connected to the dog is one end of a chain 55 whose opposite end is connected to an arm 56 which extends outward from the arm 57 of a wind vane 58. This vane is mounted for pivotal movement upon a bar 59 whose opposite ends are mounted in suitable bearings. A brace or guy rod 60 is connected to the vane 58.

It will be thus apparent that when the wind strikes the vane 58 from one direction, the dog 51 will be lifted and disengaged from the teeth 50 so as to permit the head to revolve and adjust the wheel in the path of the wind. The spring 53 will then re-engage the dog with the teeth. If the vane 58 is moved in an opposite direction, the tooth of the dog 51 will ride over the teeth 50 until the wheel reaches the proper position.

In order to pivotally adjust the segments or blades of the wheel, the slide 36 has pivotally connected thereto one end of a bar or link 61 whose opposite end is pivotally connected to one arm of a bell crank lever 62. This lever is pivotally mounted as shown at 63 and its other arm is connected to one end of a chain 64 which passes over a guide pulley 65. The other end of the chain 64 is connected to one end of a rod 66 whose opposite end is connected to an arm 67 which is carried by a collar 68, the latter being mounted upon the shaft 45 and rotatable upon and movable longitudinally of the shaft. Swiveled upon the collar 68 is a ring 69 which carries an arm 70 and this arm has connected thereto a rod or cable 71 which extends downward to within convenient reach.

By pulling downward upon the rod or cable 71, the bell crank lever 62 will be moved pivotally so as to move the slide 36 inward. This movement will, through the engagement of the plate 33 with the arms 28, swing the blade segments upwardly upon their pivots proportionate to the amount of downward pull, the rollers 32 at the inner ends of the arms 28 permitting these arms to ride radially inward upon the plate 33. When the rod or cable 71 is released, the springs 25 will return the blade segments to their normal position and as the wheel rotates, the plate 33 which is carried by the collar 34 will rotate with said wheel due to frictional engagement between the plate and the rollers 32.

The invention is susceptible of various changes in its form, proportions and minor details of construction and the right is herein reserved to make such changes as properly fall within the scope of the appended claims.

Having described the invention what is claimed is:—

1. In a windmill, a driving shaft, means to support the shaft, a wheel mounted upon the shaft, said wheel including a plurality of blades, means connecting the blades to separate the wheel into a plurality of segmental sections, means for pivotally mounting the sections, a member movable upon the driving shaft, a slide connected to said member, means to adjust the slide, a three-arm lever for each wheel section, means connecting one arm of said lever to its respective section, means associating another arm of said lever and the movable member to adjust the wheel section when the slide is moved, means to move the slide and means connected to the remaining arm of said lever to resist movement.

2. In a windmill wheel, a hub, spokes extending from said hub, plates at the outer ends of the spokes segmental blade carrying sections positioned between the arms and having their adjacent edges pivotally supported upon and connected by the plates, means to yieldingly hold the sections in active position, arms rigid with the sections, a pivotally mounted lever for each section, means connecting the levers and arms of each section, an axially movable slide, means to move the slide and means associating the slide and pivotally mounted levers to move the segmental sections pivotally.

3. A windmill wheel comprising a hub, spokes extending from the hub, plates at the outer ends of said spokes, spaced apertured ears carried by the plates, blade sections positioned between the spokes, each section including a segmental frame having concentrically arranged inner and outer bars, blades secured to the bars, means to pivotally secure the opposite ends of the frame to the opposite edges of the plates and means to adjust the blade sections pivotally.

In testimony whereof I affix my signature.

FRANK R. OWENS.